United States Patent [19]

Mizuno et al.

[11] Patent Number: 5,065,004
[45] Date of Patent: Nov. 12, 1991

[54] IC CARD READER WITH MEANS FOR INSERTING AND WITHDRAWING AN IC CARD

[75] Inventors: Yutaka Mizuno, Hachioji; Hyouei Kashiwakura, Kawasaki, both of Japan

[73] Assignee: Fanuc Ltd., Minamitsuru, Japan

[21] Appl. No.: 392,946

[22] PCT Filed: Nov. 26, 1988

[86] PCT No.: PCT/JP88/01207

§ 371 Date: Jul. 31, 1989

§ 102(e) Date: Jul. 31, 1989

[87] PCT Pub. No.: WO89/06025

PCT Pub. Date: Jun. 29, 1989

[51] Int. Cl.$^5$ .................. G06K 13/06; G06K 13/00; G11B 33/02; B65D 73/02
[52] U.S. Cl. .................. 235/479; 235/482; 235/483; 206/329; 369/75.1
[58] Field of Search .......... 235/475, 479, 482, 483, 235/486, 382; 206/328, 329, 386, 387; 200/46; 369/75.1

[56] References Cited

U.S. PATENT DOCUMENTS

| 2,372,672 | 4/1945 | Hultgren et al. | 369/75.1 |
| 3,462,567 | 8/1969 | Brown | 235/482 |
| 4,136,819 | 1/1979 | Torita et al. | 235/476 |
| 4,575,703 | 3/1986 | Shishido | 235/479 |
| 4,611,864 | 9/1986 | Yokota | 206/387 |
| 4,657,136 | 4/1987 | Yokota | 206/328 |
| 4,669,076 | 5/1987 | Broom | 369/75.1 |
| 4,734,567 | 3/1988 | Hansbauer | 235/482 |
| 4,875,584 | 10/1989 | Ackeret | 206/387 |

FOREIGN PATENT DOCUMENTS

| 0041261 | 12/1981 | European Pat. Off. | |
| 3313802 | 10/1983 | Fed. Rep. of Germany | |
| 51-62096 | 5/1976 | Japan | |
| 55-10657 | 1/1980 | Japan | |
| 2054389 | 2/1990 | Japan | 235/486 |

OTHER PUBLICATIONS

Supplementary European Search Report, EP 88 91 0133.

Primary Examiner—Stuart S. Levy
Assistant Examiner—Edward H. Sikorski
Attorney, Agent, or Firm—Staas & Halsey

[57] ABSTRACT

An IC card reader for reading an IC card, or reading and writing the IC card, the IC card reader including a withdrawing member (16) for withdrawing the IC card (5) and an L-shaped member (9) engaged with a projection (6) of the withdrawing member (16) for moving the IC card (5). The L-shaped member (9) is rotatably mounted on a door (7) of the IC card reader (1) for withdrawing the IC card (5) by opening the door (7). When the door (7) is opened, the IC card (5) is withdrawn, and when the IC card (5) is to be inserted, it is pushed in by closing the door (7). The card reader is sealed by the closed door (7).

4 Claims, 3 Drawing Sheets

IC CARD READER WITH MEANS FOR INSERTING AND WITHDRAWING AN IC CARD

TECHNICAL FIELD

The present invention relates to an IC card reader, and more specifically, to an IC card reader provided with a simple arrangement by which an IC card can be easily inserted to and withdrawn from the reader.

BACKGROUND ART

With the development of semiconductor technology the degree of memory integration has been increased, and thus an IC card now can be applied to a numerical control apparatus, a PC (programmable controller) and the like as an external memory. In practice, an IC card reader is used to read the IC card and write data thereto. In this process, the IC card is manually inserted into and withdrawn from a connector by hand or by using a fitting or the like provided at the connector.

An IC card reader applied to a numerical control apparatus and the like is often used in an adverse environment, such as in a metal processing factory and the like, and thus must be made airtight to protect electronic components such as semiconductors accommodated therein. Nevertheless, the conventional IC card reader must have an opening for use as an insertion port, and an IC card reader enabling an IC card to be inserted into and withdrawn from the reader while maintaining the interior thereof in an airtight condition is not known in the prior art. Although a non-contact type IC card has been disclosed in an attempt to solve this problem, the cost thereof is very high.

DISCLOSURE OF THE INVENTION

Taking the above into consideration, an object of the present invention is to provide an IC card reader provided with a simple arrangement by which an IC card can be easily inserted into and withdrawn from the reader.

To solve the above problem, in accordance with the present invention, there is provided an IC card reader for reading an IC card, or reading and writing an IC card, comprising a withdrawing member engaged with an edge of the IC card for withdrawing the IC card and an L-shaped member engaged with a projection of the withdrawing member for moving the IC card, the L-shaped member being rotatably mounted on a door of the IC card reader for withdrawing the IC card by opening the door.

As the door is opened, the withdrawing member for withdrawing the IC card is moved by the L-shaped member mounted on the door in such a manner that the IC card is withdrawn from the reader. Conversely, when the IC card is to be inserted into the reader, it is pushed therein by closing the door.

BEST MODE OF CARRYING OUT THE INVENTION

An embodiment of the present invention will be described below with reference to drawings.

Figure 1:
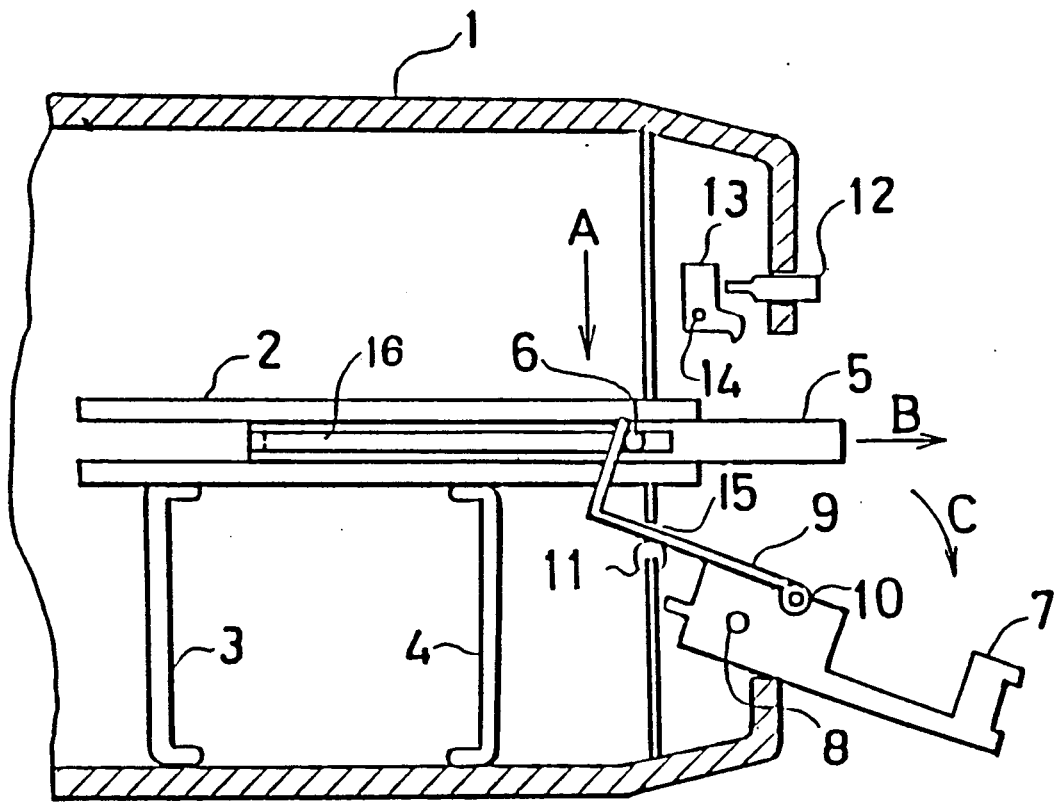
FIG. 1 is a cross sectional view of an embodiment of an IC card reader according to the present invention showing a door for the reader in an open position.

FIG. 1 is a cross sectional view of an IC card reader according to the present invention, wherein 1 designates a housing of the IC card reader, and 2 designates a guide fixed to the housing 1 by members 3 and 4, for guiding the IC card.

In FIG. 1, 5 designates an IC card engaged with a withdrawing member 16 for withdrawing the IC card 5. The withdrawing member 16 is provided with a projection 6. Designated at 7 is a door, shown in the open state in FIG. 1. This door 7 is rotatable about a shaft 8 and is provided with an L-shaped member 9 rotatably attached to a shaft 10. The L-shaped member 9 is engaged with the projection 6 of the withdrawing member 16 through a hole defined at the upper portion of a member 11. Accordingly, when the door 7 is turned in a direction shown by an arrow C in FIG. 1, the IC card 5 is withdrawn in a direction shown by an arrow B in FIG. 1.

Further in FIG. 1, 12 designates an eject button and 13 designates a latch for fixing the door 7. The latch is arranged to turn about a shaft 14.

Figure 2:
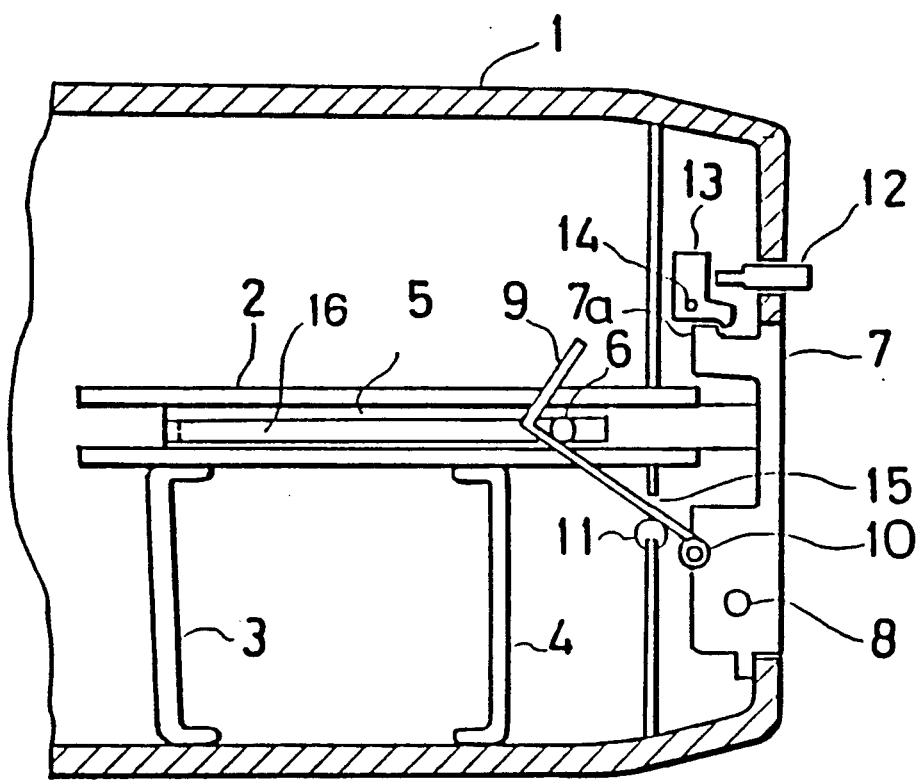
FIG. 2 is a cross sectional view of an embodiment of an IC card according to the present invention showing the door in a closed position.

FIG. 2 shows the above embodiment of the invention in the state in which the door 7 is closed. The same numerals as used in FIG. 1 are used to denote the same parts in FIG. 2. As shown in FIG. 2, the door is kept closed by an engagement between a projection 7a of the door 7 and the distal end of the latch 13.

The printed circuit boards and the like usually accommodated in the interior of the IC card reader are not shown in FIG. 1 and FIG. 2.

Figure 3:
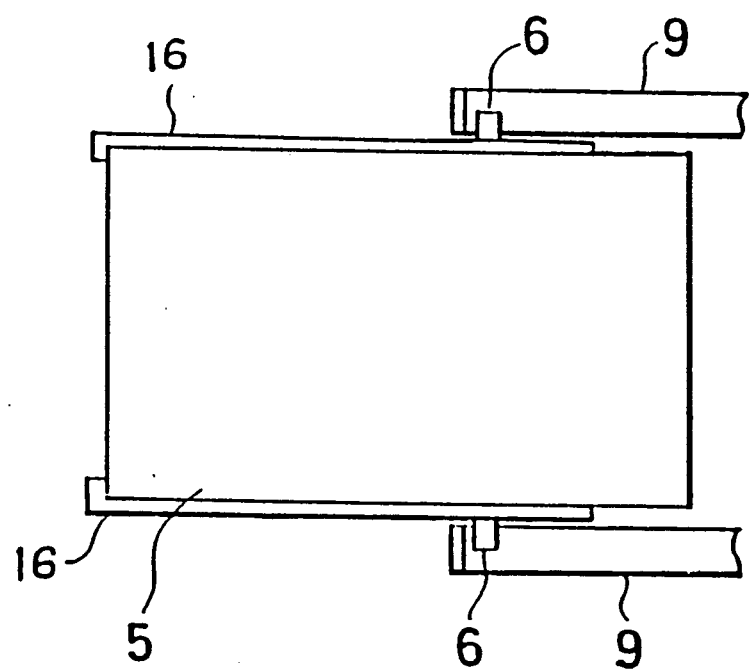
FIG. 3 is a partial plan view of the IC card reader when viewed along the line of the arrow A of FIG. 1.

FIG. 3 is a partial plan view taken along the arrow A of FIG. 1, wherein 5 designates the IC card and 16 designates the withdrawing member provided with the projection 6 for withdrawing the IC card. The withdrawing member and, consequently the IC card are pulled to the right of the figure by the L-shaped member 9 as the door is opened. The withdrawing member 16 has an arm extending inwardly at each side of its inner end for engaging an edge of the IC card.

As described above, since the IC card is pulled out by the L-shaped member attached to the door, it is not necessary to withdraw the IC card by hand or the like. In addition, since the interior of the IC card reader is sealed by the door whether the IC card is inserted or not inserted, the reliability of the IC card reader is improved. Moreover, the IC card reader can be used in an adverse environment such as with a numerical control apparatus used in a metal processing factory and the like.

As described above, according to the present invention, since the IC card is withdrawn by the L-shaped member attached to the door, it can be withdrawn with a simple arrangement of merely opening the door.

Further, since the IC card reader is sealed regardless of whether or not the IC card is inserted, it can be used in an adverse environment such as in a metal processing factory and the like.

We claim:

1. An IC card reader for reading an IC card, or reading and writing an IC card, said IC card reader comprising:

a housing having an opening therein through which an IC card may be inserted and withdrawn from said IC card reader;

a door for opening and closing said opening;

a withdrawing member mounted within said housing and positioned to engage an edge of said IC card for pulling said card outwardly through said opening to at least partially withdraw said IC card from said IC card reader through said opening when said IC card has been inserted therein, said withdrawing member having a projection thereon; and an L-shaped member rotatably mounted to said door;

said L-shaped member engaging said projection of said withdrawing member as said door is opened causing outward movement of said withdrawing member and said IC card whereby said IC card is at least partially withdrawn from said IC card reader by opening said door.

2. An IC card reader according to claim 1, wherein said IC card reader is provided with a latch for holding said door closed and an eject button for turning said latch to allow said door to be opened.

3. An IC card reader according to claim 1, wherein said withdrawing member has an inwardly projecting arm at each side of its inner end for engaging an edge of said IC card.

4. An IC card reader according to claim 1, wherein said door directly contacts said IC card as said door is closed to push said IC card into said card reader.

* * * * *